(No Model.)
R. F. & J. A. RIMMINGTON.
VELOCIPEDE CHAIN GEARING.
No. 582,024. Patented May 4, 1897.
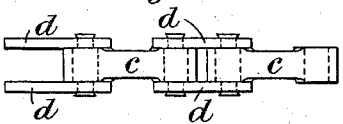
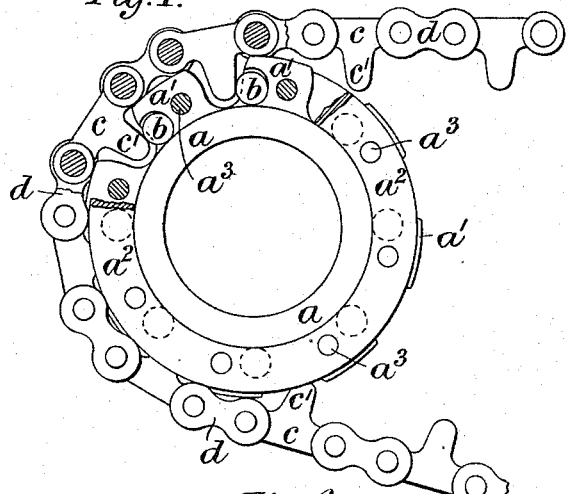
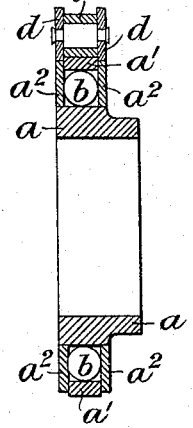
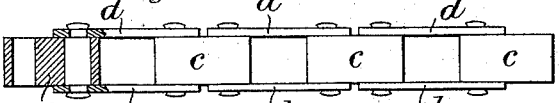
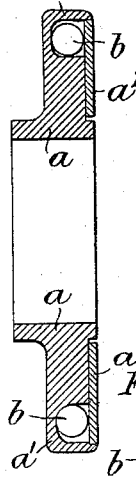
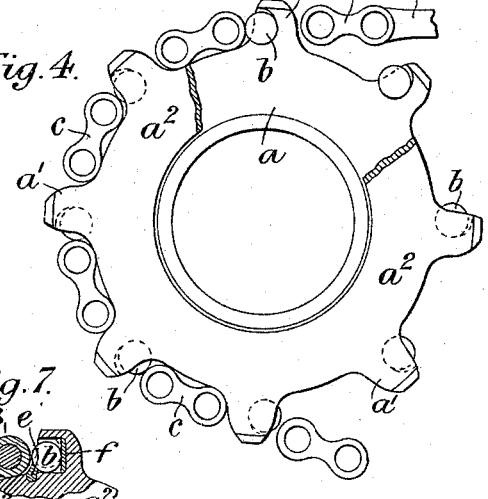
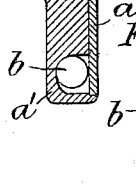
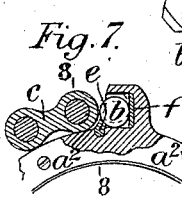
Witnesses
Guy E. Davis
E. N. Pollock
Inventors
Robert F. Rimmington
James A. Rimmington
By their Attorneys
Baldwin, Davidson & Wight
THE NORRIS PETERS CO., PHOTO-LITHO., WASHINGTON, D. C.

United States Patent Office.

ROBERT FOSTER RIMMINGTON, OF HARTLEPOOL, AND JAMES ALFRED RIMMINGTON, OF LONDON, ENGLAND.

VELOCIPEDE CHAIN-GEARING.

SPECIFICATION forming part of Letters Patent No. 582,024, dated May 4, 1897.

Application filed April 27, 1896. Serial No. 589,294. (No model.)

*To all whom it may concern:*

Be it known that we, ROBERT FOSTER RIMMINGTON, gentleman, residing at 6 Cliff Terrace, Hartlepool, in the county of Durham, and JAMES ALFRED RIMMINGTON, gentleman, residing at Ingmanthorpe, Babington Road, Streatham, London, in the county of Surrey, England, subjects of the Queen of Great Britain, have invented certain new and useful Improvements in Chain-Gearing especially suitable for Velocipedes, of which the following is a specification.

This invention has reference to a new or improved system of chain gear-wheels, whereby the friction which exists between the ordinary chain and teeth of gear-wheels is reduced with a saving in power transmitted. For this purpose the gear-wheels are provided with loose friction-balls or loose rollers suitably chambered on the periphery of the wheel. The loose friction-balls or loose rollers project on the front side of the hollow chambers or teeth of the wheel, engaging with the chain, thus obtaining a rolling-surface between the moving chain and wheel.

Figure 1 is a side elevation of a chain-wheel in accordance with our invention. Fig. 2 is a transverse section of the same. The driving-chain is also shown in these figures, and a plan of the portion of the driving-chain is shown in Fig. 3. Figs. 4, 5, and 6 are similar views and show a modification. Figs. 7 and 8 show another way of confining the loose balls or loose rollers in the chambers of the wheel.

In Figs. 1, 2, and 3, $a$ is the body of the wheel. It has teeth $a'$ $a'$, and in the leading faces of the teeth are cavities in which are placed the hard-steel balls $b$ $b$. The balls are inserted from the side of the wheel and are kept in the cavities by side plates $a^2$ $a^2$, which are fixed to the body of the wheel by pins or rivets $a^3$ $a^3$. In Fig. 1 a portion of one of the side plates is broken away. The balls project in front from the cavities in the teeth through apertures which, however, do not admit of the balls passing out through them. The chain consists of single and double links $c$ and $d$, arranged alternately and connected by pins or rivets in the usual manner. The single links $c$ have projections $c'$, which enter between the teeth of the wheel, coming into contact only with the projecting faces of the balls $b$, while the two ends of the links $c$ rest upon the summits of the teeth $a'$, so the wheel as it revolves drives the chain, or the chain in its travel drives the wheel, as the case may be.

In Figs. 4, 5, and 6 the arrangement is modified so that the single links $c$ of the chain may enter between the teeth $a'$ of the wheel and abut at their ends against the balls $b$. The chambers or cavities in the wheel also are somewhat differently formed, so that one side plate $a^2$ only is needed.

Fig. 7 is a side view, partly in section, showing an arrangement which admits of the balls $b$ being inserted from the front of the cavity. A link of the chain is also indicated in this figure.

Fig. 8 is a section on the line 8 8 in Fig. 7. $e$ is a wedge which is inserted after the ball is in place. It is driven into a groove prepared for it in the rim of the wheel. It partially closes the mouth of the cavity. $f$ is a hard-steel disk to serve as an abutment for the ball. It is inserted into the cavity before the ball is entered. The side ring $a^2$ keeps the wedges in place.

Sometimes in place of balls we employ rollers of cylindrical form with globular or conical ends.

So far as the broad features of the invention are concerned balls or spheres are considered the equivalent of rollers whose length is greater than their diameters, but in the claims we will consider spheres and elongated rollers to be included under the generic term of "rollers."

What we claim is—

1. A chain-wheel formed with teeth having rollers arranged in cavities therein, which latter are slightly longer radially than the diameter of the rollers to permit them to move bodily radially, but partially closed at their leading ends through which the rollers project to prevent the rollers from dropping out, in combination with a chain having horns projecting between the teeth and bearing against the rollers.

2. A chain-wheel formed with teeth having rollers arranged in cavities therein which are slightly longer radially than the diameter of the rollers to permit the latter to move bodily radially, but which are partially closed at their leading ends through which the rollers project, to prevent them from dropping out, in combination with a chain having horns projecting radially inward and engaging with those portions of the rollers that project from the teeth and having straight leading ends or surfaces with curved ends, substantially as described.

3. A chain-wheel having teeth formed with cavities closed on five sides and shaped to retain rollers and permit them to have a radial rolling movement and to project through openings in the sixth or leading sides of the teeth, and provided with means for preventing the rollers from dropping out of the cavities, substantially as described.

4. The combination with rollers of a chain-wheel having teeth formed with cavities closed on five sides and shaped to retain the rollers and permit them to have a radial rolling movement and project through openings in the sixth or leading sides, which are of less width than the rollers, and a chain having horns projecting between the teeth and bearing against the rollers.

5. The combination with rollers of a chain-wheel having teeth formed with cavities closed on five sides, but partially open on the sixth or leading sides, one side of the cavities being closed by an annular plate concentric with the wheel and the openings in the sixth or leading sides being of less width than the rollers, to permit them to project and also move radially.

ROBERT FOSTER RIMMINGTON.
JAMES ALFRED RIMMINGTON.

Witnesses to the signature of Robert Foster Rimmington:
JOHN WILLIAMS,
JNO. T. HEPPEL.

Witnesses to the signature of James Alfred Rimmington:
WILFRED CARPMAEL,
JOSEPH LAKE.